United States Patent [11] 3,577,093

[72] Inventor George R. Simpson
 Webster, N.Y.
[21] Appl. No. 759,594
[22] Filed Sept. 13, 1968
[45] Patented May 4, 1971
[73] Assignee The United States of America as represented by the Secretary of the Army

[54] MEANS FOR OBTAINING MULTIPLE COHERENT-LASER APERTURES
6 Claims, 5 Drawing Figs.
[52] U.S. Cl. .................................................. 331/94.5
[51] Int. Cl. .................................................. H01s 3/05
[50] Field of Search ....................................... 331/96.5

[56] References Cited
UNITED STATES PATENTS
3,312,905 4/1967 Lewis ........................... 331/94.5

Primary Examiner—Roy Lake
Assistant Examiner—Darwin R. Hostetter
Attorneys—Harry M. Saragovitz, Edward J. Kelly, Herbert Berl and Aubrey J. Dunn ABSTRACT: Multiple coherent-laser apertures produced by directing laser beams through a prism for optical interaction and coherence.

PATENTED MAY 4 1971  3,577,093

George R. Simpson,
INVENTOR.

BY Harry M. Saragovitz
Edward J. Kelly
Herbert Berl
Aubrey J. Dunn

MEANS FOR OBTAINING MULTIPLE COHERENT-LASER APERTURES

BACKGROUND OF THE INVENTION

This invention is in the field of lasers. In particular, this invention relates to the direction of laser beams through prisms to achieve optical interaction.

There is a need in many applications of lasers to increase the aperture of the beam so more laser power may be incident on a target. There is a practical limit to the aperture that can be obtained from a single laser rod. The aperture is limited by two factors. (1) If the laser rod has a large cross-sectional area, spontaneous emission in directions other than the desired direction determined by the end reflectors depopulates the inverted ions, so that they are not able to contribute their energy to the desired mode of operation. (2) If the cross-sectional area of the laser rod is too large, the majority of the pumping energy is absorbed at the periphery of the laser rod. Consequently, the inversion in the central volume of the rod is too small to induce laser action.

Presently, the only technique of introducing more volume to a coherent laser device is to restrict the aperture as determined above and to increase the length. The coherent aperture of any device, consequently, is limited by the conditions specified above and by the limit for decreasing the beam spread.

There are definite realistic limits for increasing the laser intensity through the above means. To further increase intensity, multiple laser beams must be combined. This invention provides a method for combining a plurality of laser beams to achieve a resultant beam having a coherent aperture.

SUMMARY OF THE INVENTION

Two laser beams are focused to coincide on the base of a prism. The prism is oriented so that the base of the prism bisects the angle formed by the two laser beams. Part of each beam is reflected into the other by the base of the prism. The vertex angle and thickness of the prism determines the angle at which the coherent beams emerge. Proper selection of these variables enables the beams to emerge parallel and adjacent each other. The resulting coherent aperture is twice that of a single rod.

DESCRIPTION OF THE PREFERRED EMBODIMENT

Figures 1, 2:
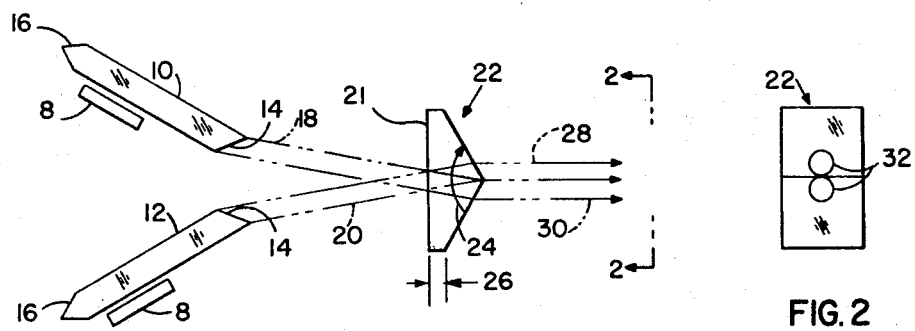
FIG. 1 is a schematic diagram of a preferred embodiment of the present invention.
FIG. 2 is an end view of FIG. 1 taken about line 2—2.

Referring to FIG. 1, laser rods 10 and 12 are independently pumped by conventional means 8. The laser rods have a bevel 14 on one end of the rod and a roof prism 16 on the other end. The bevel is placed on the rods so that its Fresnel reflection and the roof prism do not form a Fabry-Perot-type cavity which would result in independent laser action in each rod. The two rods are spacially oriented so that their beams 18 and 20 coincide at the base facet 21 of the pentaprism 22. Pentaprism 22 is oriented so that the normal to the pentaprism base facet 21 bisects the angle formed by the two laser beams 18 and 20. Part of the power emitted by each rod will be Fresnel reflected by the prism base facet into the other. Thus, a Fabry-Perot-type cavity having end reflectors 16 is formed via the Fresnal reflections. This optical coupling between the two laser beams causes the radiation output of each from the prism to be coherent with that of the other. The vertex angle 24 and thickness 26 of the prism 22 are adjusted so that the coherent beams 28 and 30 emerge from the prism at virtually any angle desired. The two laser beams of FIG. 1 emerge parallel coherent, and adjacent. The resulting coherent aperture 32 (FIG. 2) is the sum of the apertures of the single rods 10 and 12, or a multiple of the aperture of a single laser rod.

Figure 3:
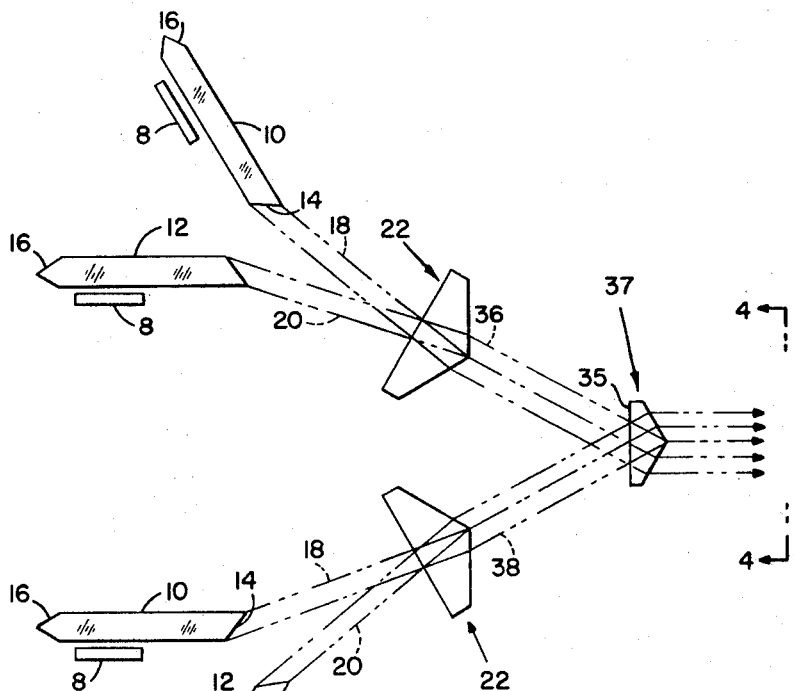
FIG. 3 is a schematic diagram of another embodiment of the present invention.
Figure 4:
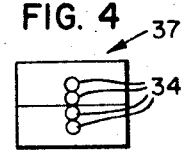
FIG. 4 is an end view of FIG. 3 taken about line 4—4.

If it is desired to enlarge the aperture 32 of FIG. 2, the basic configuration of FIG. 1 may be stacked as shown in FIG. 3. The basic configuration of FIG. 1 comprises laser rods 10 and 12, pentaprism 22, and pumping means 8. Two of these configurations are shown in FIG. 3 arranged to produce an aperture 34 (FIG. 4) twice as large as the aperture of FIG. 2. Coherence between the laser beams within each basic configuration is the same as it was in the preferred embodiment shown in FIG. 1. Coherence between the beams of the basic configurations is achieved by the same method as was coherence between the individual laser beams of the basic configuration. Coherence between the beams 36 and 38 emerging from the basic configurations is created by the Fresnel reflections coupling of prism base 35 of pentaprism 37. It is apparent that the basic configurations may be stacked in various arrangements to achieve a diversified arrangement of coherent laser apertures.

Figure 5:
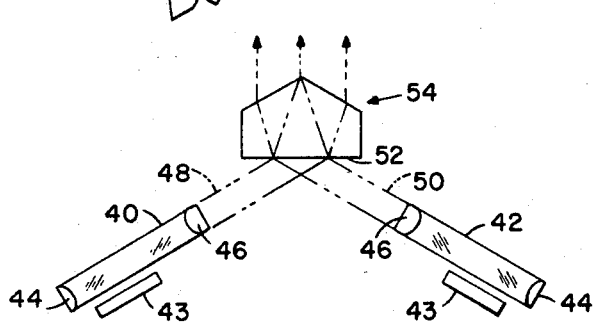
FIG. 5 is a schematic diagram of yet another embodiment of the present invention.

Another form of this invention is shown in FIG. 5. This embodiment yields multiple coherent apertures that emit plane-polarized laser radiation. Laser rods 40 and 42 are pumped by conventional means 43 and have a roof prism 44 on one end and a Brewster's angle bevel 46 on the other end. The laser energy emitted from the rods will inherently be plane polarized because of the Brewster's bevel. The laser rods are oriented so that the laser beams 48 and 50 are coincident on the base facet 52 of pentaprism 54 and are incident at the pentaprism's Brewster's angle. The rods are also oriented so that the E-vector of the polarized laser energy is normal to the plane of the drawing. The laser energy in the plane of polarization, with the E-vector vibrating normal to the plane of the drawing, is refracted through the Brewster's bevel without any Fresnel reflection. The laser polarization parallel to the plane of the drawing is nonexistent because there is zero Fresnel reflection at the prism base for this polarization. Thus, a Fabry-Perot-type cavity for this polarization is not established and no laser action occurs.

It will be apparent to those skilled in the art that changes may be made in the form of the apparatus disclosed without departing from the spirit of the invention as set forth in the appended claims, and that in some cases certain features of the invention may sometimes be used to advantage without a corresponding use of the other features.

I claim:

1. In combination: a plurality of laser-emitting rods and a pentaprism having a cross section comprising generally an A-shaped roof, two sides, two ends, and a base, said rods being oriented so that their respective laser beams are coincident on said base of said prism, said laser beams being refracted by said prism and emerging from said prism to form a coherent laser aperture proportional to the sum of the laser energy emitted by said rods, said laser-emitting rods having a roof prism on a first end and a bevel angle on a second end, said bevel being placed on said rod to produce coherent laser action between said rods wherein said laser beams coincident on said base are Fresnel reflected by said base into each opposite rod to form a Fabry-Perot-type cavity having end reflectors formed by said roof prism on said first end of said rods.

2. The invention as set forth in claim 1 wherein the longitudinal axes of said laser-emitting rods lie in the same plane.

3. The invention as set forth in claim 2 wherein a line normal to said side of said prism lies in said plane and bisects the angle between said laser beams.

4. The invention as set forth in claim 1 wherein said bevel is a Brewster's angle bevel.

5. The invention as set forth in claim 4 wherein said laser beams are plane polarized and wherein the E-vector of said plane polarized laser beams is parallel to the longitudinal axis of said prism, said laser beams being incident on said side of said prism at the Brewster's angle of said prism.

6. The invention as set forth in claim 1 wherein said laser beams emerging from said prism are parallel, adjacent and coherent.